United States Patent
Scaffidi Muta et al.

(10) Patent No.: US 11,467,435 B2
(45) Date of Patent: Oct. 11, 2022

(54) DEVICE AND METHOD FOR DETECTING THE SPARKLE EFFECT OF A TRANSPARENT SAMPLE ARRANGED IN FRONT OF AN IMAGE SOURCE

(71) Applicant: C.R.F. Società Consortile per Azioni, Orbassano (IT)

(72) Inventors: Fabio Scaffidi Muta, Orbassano (IT); Nello Li Pira, Orbassano (IT); Luca Belforte, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 281 days.

(21) Appl. No.: 16/827,878

(22) Filed: Mar. 24, 2020

(65) Prior Publication Data

US 2020/0310171 A1    Oct. 1, 2020

(30) Foreign Application Priority Data

Apr. 1, 2019  (EP) ..................... 19166559

(51) Int. Cl.
*G02F 1/23*    (2006.01)
*G02F 1/13*    (2006.01)
(Continued)

(52) U.S. Cl.
CPC ............. *G02F 1/1309* (2013.01); *G01J 1/42* (2013.01); *G02F 1/1313* (2013.01); *G02F 1/133502* (2013.01); *G01J 2001/4247* (2013.01)

(58) Field of Classification Search
CPC ......... G01N 21/958; G01N 2021/8887; G01N 21/21; G01N 2021/216; G01N 2021/9513; G01N 21/3581; G01N 2201/062; G01N 2021/8848; G01N 21/88; G01N 2021/8854; G01N 21/3563; G01N 21/898; G01N 21/553; G01N 2201/063; G01N 21/8803; G01N 2021/6423; G01N 21/00;
(Continued)

(56) References Cited

U.S. PATENT DOCUMENTS 7,202,950 B2 * 4/2007 Shribak ..................... G01J 4/00
                                                              356/364
7,446,871 B2 * 11/2008 Plant ....................... G01N 21/21
                                                              356/364
(Continued)

OTHER PUBLICATIONS

Becker, Michael E., "Standardization of Sparkle Measurements: A Solid Basis", SID 2017 Digest, p. 72-75 (May 1, 2018).

(Continued)

*Primary Examiner* — Vinh P Nguyen
(74) *Attorney, Agent, or Firm* — RMCK Law Group PLC

(57) ABSTRACT

A device for detecting a sparkle effect of a transparent sample arranged in front of an image source, to which also a first polarizer having an optical axis of polarization is associated, wherein the detection device includes an imaging system, and wherein the transparent sample, the first polarizer and the imaging system are arranged along an optical path originated from the image source. The detection device includes a second polarizer, arranged between the transparent sample and the imaging system, having an optical axis of polarization directed at ninety degrees with respect to the optical axis of polarization of the first polarizer.

15 Claims, 1 Drawing Sheet

(51) Int. Cl.
 *G01J 1/42* (2006.01)
 *G02F 1/1335* (2006.01)
(58) Field of Classification Search
 CPC ........... G01N 21/8901; G01N 21/8903; G01N 27/04; G01N 15/0227; G01N 15/1434; G01N 2033/0003; G01N 21/554; G01N 21/9054; G01N 2201/08; G06F 3/0425; G06F 3/0418; G06F 3/042; G06F 3/0488; G02B 27/283; G02B 27/286; G02B 5/3058; G02B 19/0028; G02B 19/0061; G02B 5/3025; G02B 21/0092; G02B 21/0068; G02B 21/06; G02B 21/36; G02B 27/28; G02B 6/4216; G02B 1/041; G02B 21/0032; G02B 27/288; G02B 27/0955; G02B 30/25; G02B 19/0052; G02B 19/0047; G02B 2027/0138; G02B 2027/014; G02B 2027/0185; G02B 21/0004; G02B 21/0052; G02B 21/006; G02B 27/0031; G02B 30/00; G02B 30/56; G01J 3/447; G01J 3/2823; G01J 4/00; G01J 2003/2826; G01J 3/0208; G01J 1/0429; G01J 2003/2806; G01J 2009/0261; G01J 9/0246; G01R 29/0885; G01R 33/032; G01R 31/311; G01R 33/0325; G01R 33/282; G01R 33/285; G01R 33/3621; G01R 33/3692; G01R 33/4808; G01R 33/5601
 See application file for complete search history.

(56) References Cited

U.S. PATENT DOCUMENTS

| 7,802,883 | B2* | 9/2010 | Wright | G02C 7/046 351/159.31 |
| 9,411,180 | B2* | 8/2016 | Gollier | G01J 1/4228 |
| 9,701,579 | B2* | 7/2017 | Gollier | C03C 15/00 |
| 10,386,236 | B2* | 8/2019 | Hayashi | G01J 3/45 |
| 2012/0221264 | A1 | 8/2012 | Gollier et al. | |

OTHER PUBLICATIONS

V. Ferreras Paz et al., "Sparkle Characterization of Anti-glare Layers on Displays with a Grey Value Histogram Analysis", SID 2018 Digest, p. 76-79 (May 1, 2018).
European Search Report dated Sep. 25, 2019. 5 pages.

* cited by examiner

DEVICE AND METHOD FOR DETECTING THE SPARKLE EFFECT OF A TRANSPARENT SAMPLE ARRANGED IN FRONT OF AN IMAGE SOURCE

CROSS-REFERENCE TO RELATED APPLICATION

This application claims priority to European Patent Application No. 19 166 559.5 filed Apr. 1, 2019. The disclosure of the above application is incorporated herein by reference in its entirety.

TECHNICAL FIELD

The present invention relates to a device for detecting the sparkle effect of a transparent sample arranged in front of an image source, to which a first polarizer having an optical axis of polarization is associated, wherein said detection device includes an imaging system, and wherein said transparent sample, said first polarizer and said imaging system are arranged along an optical path originated from said image source.

The sparkle effect is here intended as an effect of appearance of very fine grainy optical formations on a screen of a light radiation source, for example an image source.

PRIOR ART

A device of the abovementioned type is disclosed and illustrated for example in document U.S. Pat. No. 9,411,180 B2. In this known solution the detection of the sparkle effect of a transparent sample arranged in front of an image source is carried out by placing an aperture between said transparent sample and an imaging system arranged along an optical path originated from the image source. The aperture allows to vary the angle of acquisition of an image originated from the image source according to measurement variables assimilable to the human eye parameters, thus allowing to simulate a detection of the sparkle effect as perceived by the eye of an observer facing the image source.

Nonetheless this know solution involves a very laborious method of calculation of the sparkle effect of the transparent sample, since the extrapolation of parameters associated to the image pixels, which are processed by means of a mathematic algorithm including numerous steps, is necessary.

OBJECT OF THE INVENTION

The object of the present invention is to implement a device for detecting the sparkle effect of a transparent sample of the type mentioned at the beginning of the present description which is of simple and inexpensive use.

A further object of the invention is to implement a device of the type mentioned above which provides a detection of said sparkle effect which is quick and as much reliable as possible.

A further object of the invention is to implement a device of the type mentioned above which provides a detection of the morphology of a transparent sample which is quick and as much reliable as possible.

A further object of the invention is to implement a device of the type mentioned above which provides a detection of the presence of defects on a transparent sample, for example fractures and delaminations, which is quick and as much reliable as possible.

A further object of the invention is to provide a method for the detection of the sparkle effect of a transparent sample which can be used as control and validation method in industry, both in design and production phases.

SUMMARY OF THE INVENTION

In view of achieving one or more of the abovementioned objectives, the invention relates to a device for detecting the sparkle effect of a transparent sample arranged in front of an image source, to which also a first polarizer having an optical axes of polarization is associated, wherein said device includes an imaging system, and wherein said transparent sample, said first polarizer and said imaging system are arranged along an optical path originated from said image source.

Said device is characterized in that it includes a second polarizer arranged between said transparent sample and said imaging system, said second polarizer having an optical axis of polarization directed at ninety degrees with respect to the optical axis of polarization of said first polarizer.

In this way, the light radiation which does not suffer a change of polarization when passing through the transparent sample is eliminated, and it is possible to visualize and locate only zones in which the light radiation suffers a change of polarization, namely the zones which induce optical phenomena, including the sparkle effect.

In the preferred embodiment, the transparent sample includes at least one layer of glass or plastic material. Preferably, the glass layer consists of silicate glass, for example boric silicate glass, soda-lime silicate glass, aluminized silicate glass. Preferably, the plastic material layer consists of polycarbonate or polymethylmethacrylate or polyester or polyethylene terephthalate or polyethylene naphthalate.

According to a further characteristic of the preferred embodiment, the transparent sample has at least one anti-reflective functional surface, or at least one anti-glare functional surface, or at least one anti-fingerprint functional surface, or at least one anti-scratch functional surface, preferably facing the imaging system.

In one embodiment, the at least one functional surface is obtained by means of a mechanical treatment, for example by surface roughening, or a chemical treatment, for example by etching, of a surface of the transparent sample. In another embodiment, the at least one functional surface is obtained by applying a functional coating on a plastic material applied on a surface of the transparent sample.

Preferably, the imaging system is arranged on an axis coincident with the axis of the image source. Alternatively, the imaging system is arranged on an axis non-coincident with the axis of the abovementioned image source; in this case the device includes a reflecting system, for example a lens, arranged so that it reflects the image originated from the image source towards the imaging system.

In the preferred embodiment of the invention, the image source is a Liquid Crystal Display (LCD). In this case the first polarizer is integrated in the LCD.

In the preferred embodiment the imaging system includes:
- a Charge-Coupled-Device (CCD) camera, having a camera lens, and
- an electronic processing and control unit, to process signals output from the device.

In one embodiment, the electronic processing and control unit is configured to process a mapping in luminance scale from which, by means of a suitable analysis, it is possible to evaluate the sparkle effect and to obtain information on the morphology of the sample. In another embodiment, the electronic processing and control unit is configured to process a mapping in true colors of the sparkle effect.

In the preferred embodiment, the second polarizer is coupled to the CCD camera lens.

The invention also relates to a method for detecting the sparkle effect of a transparent sample arranged in front of an image source, to which also a first polarizer having an optical axis of polarization is associated, wherein said detection method includes providing an imaging system, said transparent sample, said first polarizer and said imaging system being arranged along an optical path originated from said image source, said detection method being characterized in that it further includes:
  providing a second polarizer having an optical axis of polarization between said transparent sample and said imaging system, and
  directing said second polarizer so that its optical axis of polarization is directed at ninety degrees with respect to the optical axis of polarization of said first polarizer.

In the preferred embodiment, the second polarizer is rotatably mounted on a supporting structure and is rotated until its optical axis of polarization is directed to ninety degrees with respect to the optical axis of polarization of the first polarizer.

BRIEF DESCRIPTION OF THE DRAWINGS

Further characteristics and advantages of the invention will become apparent from the description that follows with reference to the attached drawings, provided purely by way of non-limiting example, wherein.

DETAILED DESCRIPTION OF THE INVENTION

As already mentioned above, the sparkle effect is here intended as an effect of appearance of very fine grainy optical formations on a screen of a light radiation source, for example an image source. The sparkle effect changes according to the angle of observation of the screen, the light source and the surface treatment.

Figure 1:
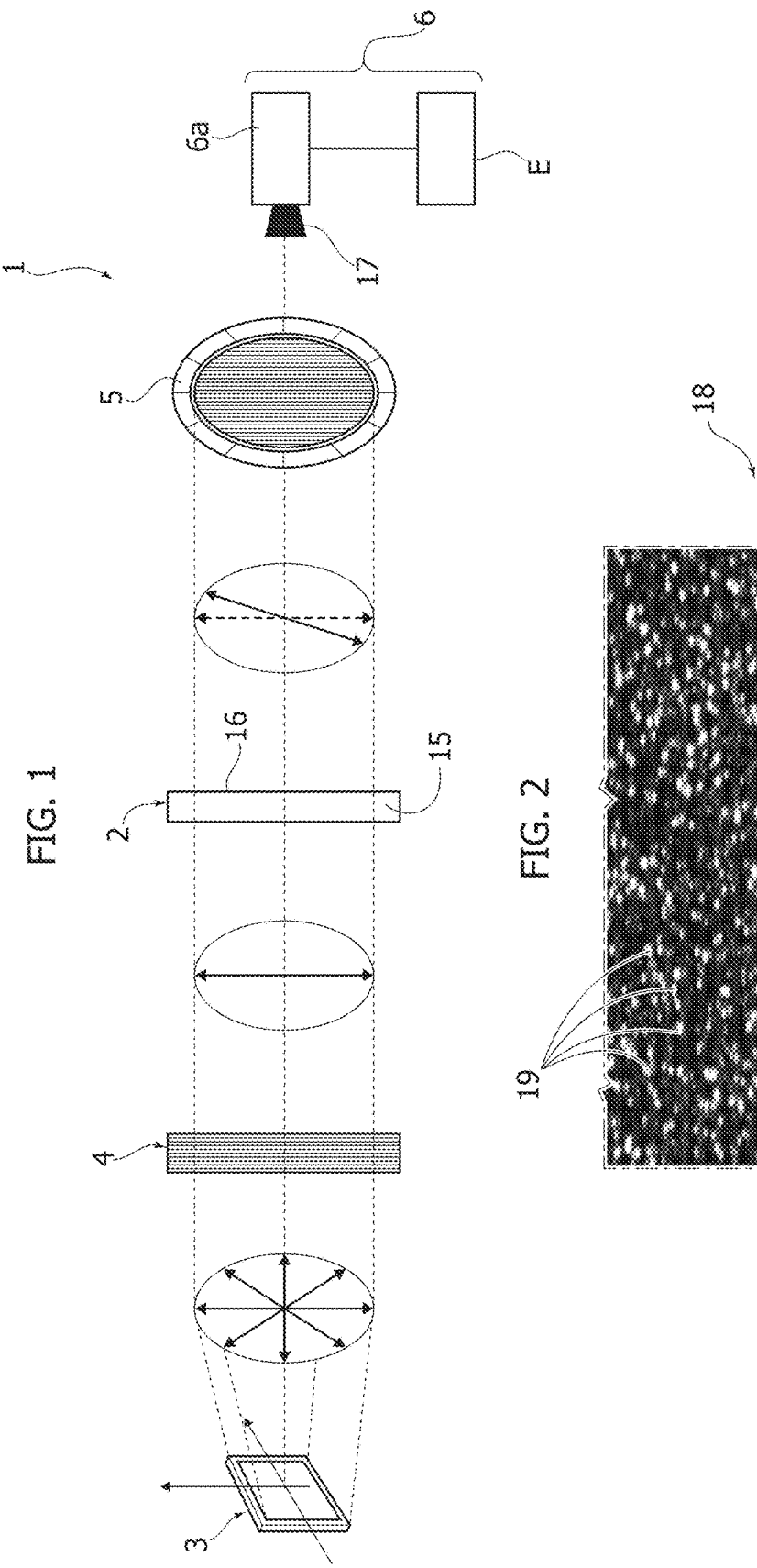
FIG. 1 is a scheme of the device object of the present invention, arranged in front of an image source, a first polarizer and a transparent sample.

With reference to FIG. 1, numeral 1 indicates in its entirety a device for detecting the sparkle effect of a transparent sample 2 implemented according to an embodiment of the present invention. In the case of the example illustrated in FIG. 1, the device 1 is arranged in front of the transparent sample 2 whose sparkle effect is intended to be evaluated. The transparent sample 2 is in turn arranged in front of an image source 3, to which also a first polarizer 4 having an optical axis of polarization is associated.

In the embodiment represented in FIG. 1, the image source 3 is a flat rectangular screen, but it is evident that this characteristic is not to be understood in a limiting sense and that the image source 3 may be a screen different from the one represented, for example a screen with a curvature or a screen with a shape other than rectangular. Examples of devices of common use having a screen whose sparkle effect can be evaluated by using the device 1 are, for example, a smartphone or a display of the dashboard of a motor vehicle.

The first polarizer 4 is arranged between the image source 3 and the transparent sample 2. In the illustrated embodiment, the transparent sample 2 is distanced from the first polarizer 4, but also embodiments wherein the transparent sample 2 is adjacent and in contact with the first polarizer 4 fall within the scope of protection of the present invention.

As can be seen in FIG. 1, the device 1 includes a second polarizer 5, having an optical axis of polarization directed at ninety degrees with respect to the optical axis of polarization of the first polarizer 4, and an imaging system 6. More specifically, the second polarizer 5 is arranged between the transparent sample 2 and the imaging system 6.

In the present description, and in the attached drawings, the details of construction of the first polarizer 4 and of the second polarizer 5 are not illustrated, since the polarizers can be made in any known way, and since these details, taken separately, are outside the scope of the present invention. Moreover, the elimination of abovementioned details from the drawings makes the latter simpler and more readily understandable.

In the specific embodiment represented in FIG. 1, the image source 3 and the first polarizer 4 are separate structures. Nonetheless, the invention is of general application and can be used for example also to detect the sparkle effect of a device in which the first polarizer 4 is integrated in the image source 3, as in the case of a Liquid Crystal Display (LCD). In this case, the transparent sample 2 can be distanced from the LCD screen or adjacent and in contact with the LCD screen. Even more than one polarizer can be integrated in the image source 3.

In the embodiment represented in FIG. 1, the transparent sample 2 includes a glass layer 15. It is to be intended that the glass can consist of silicate glass, for example boric silicate glass, soda-lime silicate glass and aluminized silicate glass, arranged in one or more layers, falling within the scope of protection of the present invention. Differently from what is represented in FIG. 1, the transparent sample 2 can also include one or more layers of a plastic material, for example polycarbonate or polymethylmethacrylate or polyester or polyethylene terephthalate or polyethylene naphthalate.

As can be seen in FIG. 1, the transparent sample 2 has a functional surface 16 facing the imaging system 6. In the embodiment represented in FIG. 1 this functional surface is an anti-reflective functional surface, but also embodiments wherein the functional surface is an anti-glare functional surface, an anti-fingerprint functional surface, an anti-scratch functional surface fall within the scope of protection of the present invention. Albeit a single functional surface 16 is represented in the illustrated embodiment, also embodiments wherein the transparent sample 2 has more than one functional surface 16 fall within the scope of protection of the present invention. It is also possible that the functional surface 16 does not face the imaging system 6. In this case a reflecting system (not illustrated), for example a lens, is used to reflect the light radiation originated from the image source 3 towards the imaging system 6.

In the represented embodiment, the functional surface 16 is obtained by applying a film of plastic material on the surface of the transparent sample 2 facing the imaging system 6. This film can be applied by interposing a double-sided adhesive layer between the plastic material of the film and the transparent sample 2, but also embodiments wherein the film of plastic material is applied on a surface of the transparent sample 2 in different ways, for example by exploiting electrostatic or chemical interactions or alternatively by using a gap of air fall within the scope of protection of the present invention.

In another embodiment, the functional surface 16 is applied on the plastic material by means of In-Mold Labeling techniques.

In another embodiment, the functional surface 16 is obtained by means of a mechanical treatment, for example by surface roughening, or by means of a chemical treatment, for example by etching, of a surface of the transparent sample 2.

In the embodiment illustrated in FIG. 1 the second polarizer 5 is fixed, but also embodiments wherein the second polarizer 5 is movable fall within the scope of protection of the present invention. For example, the second polarizer 5 can be rotatably mounted on a supporting structure and rotated until its optical axis of polarization is directed at ninety degrees with respect to the optical axis of polarization of the first polarizer 4.

Conversely, it is also possible that the second polarizer 5 is fixed and the first polarizer 4 is movable, for example rotatably mounted on a supporting structure and rotated until its optical axis of polarization is directed at ninety degrees with respect to the optical axis of polarization of the second polarizer 5.

In the embodiment illustrated in FIG. 1 the second polarizer 5 is distanced from the transparent sample 2, but it is evident that this characteristic is not to be intended in a limiting sense. In fact, also embodiments wherein the second polarizer 5 is adjacent and in contact with the transparent sample 2 fall within the scope of protection of the present invention.

In the embodiment illustrated in FIG. 1, the second polarizer 5 is distanced from the imaging system 6, but also embodiments wherein the second polarizer 5 is adjacent and in contact with the imaging system 6 fall within the scope of protection of the present invention.

In the example illustrated in FIG. 1 the transparent sample 2, the first polarizer 4 and the imaging system 6 are arranged along an optical path originated from the image source 3. In the represented embodiment, the imaging system 6 is arranged on an axis coincident with the axis of the image source 3, but also embodiments wherein the imaging system 6 is arranged on an axis non-coincident with the axis of the image source 3 fall within the scope of protection of the present invention. In this case the device includes at least one reflecting system (not illustrated), for example a lens, arranged so that it reflects the image originated from the image source 3 towards the imaging system 6.

In the represented embodiment, the imaging system 6 is fixed with respect to the image source 3. Nonetheless, also embodiments wherein the imaging system 6 can rotate with respect to the image source 3 fall within the scope of protection of the present invention. In this case, the imaging system 6 is able to acquire images originated from the image source 3 useful to evaluate the variation of the sparkle effect of the transparent sample 2 according to the image acquisition angle.

In the embodiment represented in FIG. 1, the imaging system 6 includes a Charge-Coupled-Device (CCD) camera 6a, having a camera lens 17. Nonetheless, also embodiments having different imaging systems 6, able to receive and eventually store the image originated from the image source 3, fall within the scope of protection of the present invention.

Figure 2:
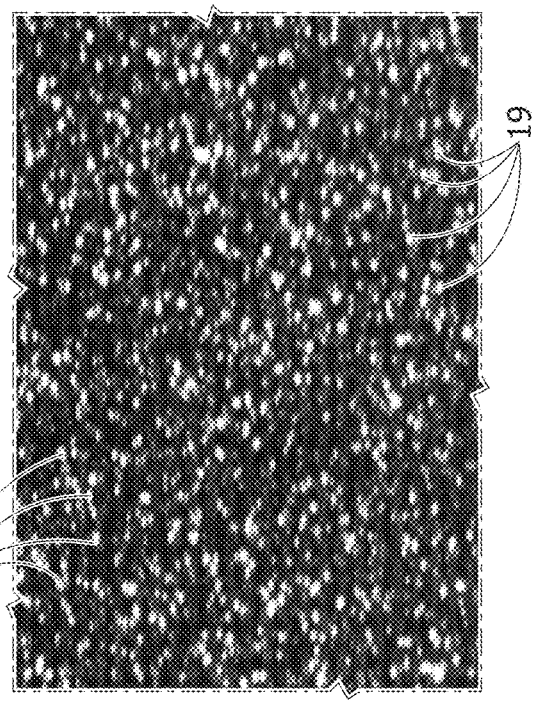
FIG. 2 is a reproduction of a mapping in luminance scale of the sparkle effect processed according to the method object of the present invention.

The imaging system 6 also includes an electronic processing and control unit E (see FIG. 1), to process signals output from the camera 6a. In the illustrated example, the electronic processing and control unit E is configured to process a mapping 18 in luminance scale, as shown in FIG. 2, from which, by means of a suitable analysis, it is possible to evaluate the sparkle effect and to obtain information on the morphology of the transparent sample 2. Nonetheless, also embodiments wherein the electronic processing and control unit E is configured to process a mapping in true colors of the sparkle effect fall within the scope of protection of the present invention.

In the embodiment represented in FIG. 1, the second polarizer 5 is distanced from the CCD camera 6a. Nonetheless, also embodiments wherein the second polarizer 5 is coupled to the lens 17 of the CCD camera 6a fall within the scope of protection of the present invention.

The invention also relates to a method for detecting the sparkle effect of a transparent sample 2 arranged in front of an image source 3, to which a first polarizer 4 having an optical axis of polarization is associated, which includes the steps of:

providing an imaging system 6 along an optical path originated from the image source 3, along which also the first polarizer 4 and the transparent sample 2 are arranged, providing a second polarizer 5 having an optical axis of polarization between the transparent sample 2 and the imaging system 6, and directing the second polarizer 5 so that its optical axis of polarization is directed at ninety degrees with respect to the optical axis of polarization of the first polarizer 4.

It is to be intended that the abovementioned method can be carried out by using any one of the embodiments of the device 1 described above.

In use of the embodiment represented in FIG. 1, the image source 3 emits an image in form of non-polarized light radiation. This light radiation is polarized after passing through a first polarizer 4 arranged in front of the image source 3. After passing through a transparent sample 2 having a functional surface 16, obtained by applying a plastic film on a surface of the transparent sample 2, the sparkle effect occurs, due to the fact that the polarized light radiation exiting from the first polarizer 4, by passing through the functional surface 16 of the transparent sample 2, suffers a change of polarization in correspondence of the zones in which the sparkle effect occurs. The light radiation exiting from the transparent sample 2 passes through a second polarizer 5, having an optical axis of polarization directed at ninety degrees with respect to the optical axis of polarization of the first polarizer 4.

In this way, the light radiation which does not suffer a change of polarization when passing through the transparent sample 2 is eliminated, and it is possible to visualize and locate only the zones in which the light radiation suffers a change of polarization, namely the zones in which the sparkle effect occurred. The light radiation exiting from the second polarizer 5 is therefore collected by a CCD camera 6a and sent to an electronic processing and control unit E, which processes a mapping 18 in luminance scale or in true colors of the sparkle effect.

The method object of the present invention can include the further step of extrapolating one or more numerical parameters from the mapping 18 processed by the imaging system 6, for example by evaluating the density per unit area of the very fine grainy formations 19 associated to the sparkle effect or by quantifying the color variation caused by the sparkle effect.

If the image source 3 is the display screen on a dashboard of a motor vehicle, the method which is the subject of the present invention can be carried out in the interior of the passenger compartment of the motor vehicle, so that the sparkle effect perceived from the driver and/or from a passenger of the motor vehicle is detected.

As is evident from the preceding description, the device according to the invention is characterized by a greater easiness of use with respect to currently known devices for evaluating the sparkle effect. The possibility of obtaining a direct measurement of the sparkle effect by eliminating the component of light radiation which does not suffer a change of polarization when passing through the transparent sample makes the device and the method object of the present invention ideal to be used as control and validation method in the industry, both in design and production phases.

Studies and tests carried out by the Applicant also have shown that, by using the device and the method subject of the present invention, the Moiré effect, namely the generation of an interference due to a non-optimal overlap between the screen grid and the grid of the camera used as imaging system, is eliminated. The elimination of the Moiré effect involves a greater versatility in the placement of the imaging system with respect to the image source, by speeding up and simplifying the measurement operations of the sparkle effect.

Naturally, without prejudice to the principle of the invention, the details of construction and the embodiments may vary widely with respect to those described and illustrated purely by way of example, without departing from the scope of the present invention, as defined by the attached claims.

What is claimed is:

1. A device for detecting a sparkle effect of a transparent sample arranged in front of an image source, to which also a first polarizer having an optical axis of polarization is associated, the device comprising:
    an imaging system,
    wherein said transparent sample, said first polarizer and said imaging system are arranged along an optical path originated from said image source, and
    a second polarizer arranged between said transparent sample and said imaging system, said second polarizer having an optical axis of polarization directed at ninety degrees with respect to the optical axis of polarization of said first polarizer,
    wherein the imaging system detects the sparkle effect of the transparent sample.

2. The device according to claim 1, wherein said transparent sample includes at least one layer of glass or plastic material.

3. The device according to claim 2, wherein said at least one layer of glass consists of silicate glass.

4. The device according to claim 2, wherein said transparent sample has at least one surface selected from an anti-glare surface, an anti-fingerprint surface, an anti-reflective surface, and an anti-scratch surface.

5. The device according to claim 4, wherein said at least one functional surface is facing said imaging system.

6. The device according to claim 4, wherein said at least one functional surface is obtained by means of a mechanical or chemical treatment of a surface of said transparent sample.

7. The device according to claim 4, wherein said at least one functional surface is obtained by applying a film of plastic material on a surface of said transparent sample.

8. The device according to claim 1, wherein said imaging system is arranged on an axis non-coincident with the axis of said image source, and wherein said device includes at least one lens arranged so that said at least one lens reflects an image originated from said image source towards said imaging system.

9. The device according to claim 1, wherein said image source is a Liquid Crystal Display screen, said first polarizer being integrated in said Liquid Crystal Display screen.

10. The device according to claim 1, wherein the imaging system includes:
    a Charge-Coupled-Device camera, having a camera lens, and
    an electronic processing and control unit, to process signals output from said camera.

11. The device according to claim 10, wherein said electronic processing and control unit is configured to process a mapping in luminance scale of the sparkle effect.

12. The device according to claim 10, wherein said electronic processing and control unit is configured to process a mapping in true colors of the sparkle effect.

13. The device according to claim 10, wherein said second polarizer is coupled to said Charge-Coupled-Device camera lens.

14. A method for detecting a sparkle effect of a transparent sample arranged in front of an image source, to which also a first polarizer having an optical axis of polarization is associated, said detection method including:
    providing an imaging system, wherein said transparent sample, said first polarizer and said imaging system are arranged along an optical path originated from said image source,
    providing a second polarizer having an optical axis of polarization between said transparent sample and said imaging system,
    directing said second polarizer so that its optical axis of polarization is directed at ninety degrees with respect to the optical axis of polarization of said first polarizer, and
    detecting the sparkle effect of the transparent sample with the imaging system.

15. The method according to claim 14, wherein said second polarizer is rotated until its optical axis of polarization is directed at ninety degrees with respect to the optical axis of polarization of said first polarizer.

* * * * *